Sept. 12, 1961
LE ROY F. RAMER
2,999,582
BELT CONVEYORS
Filed April 13, 1959
2 Sheets-Sheet 1
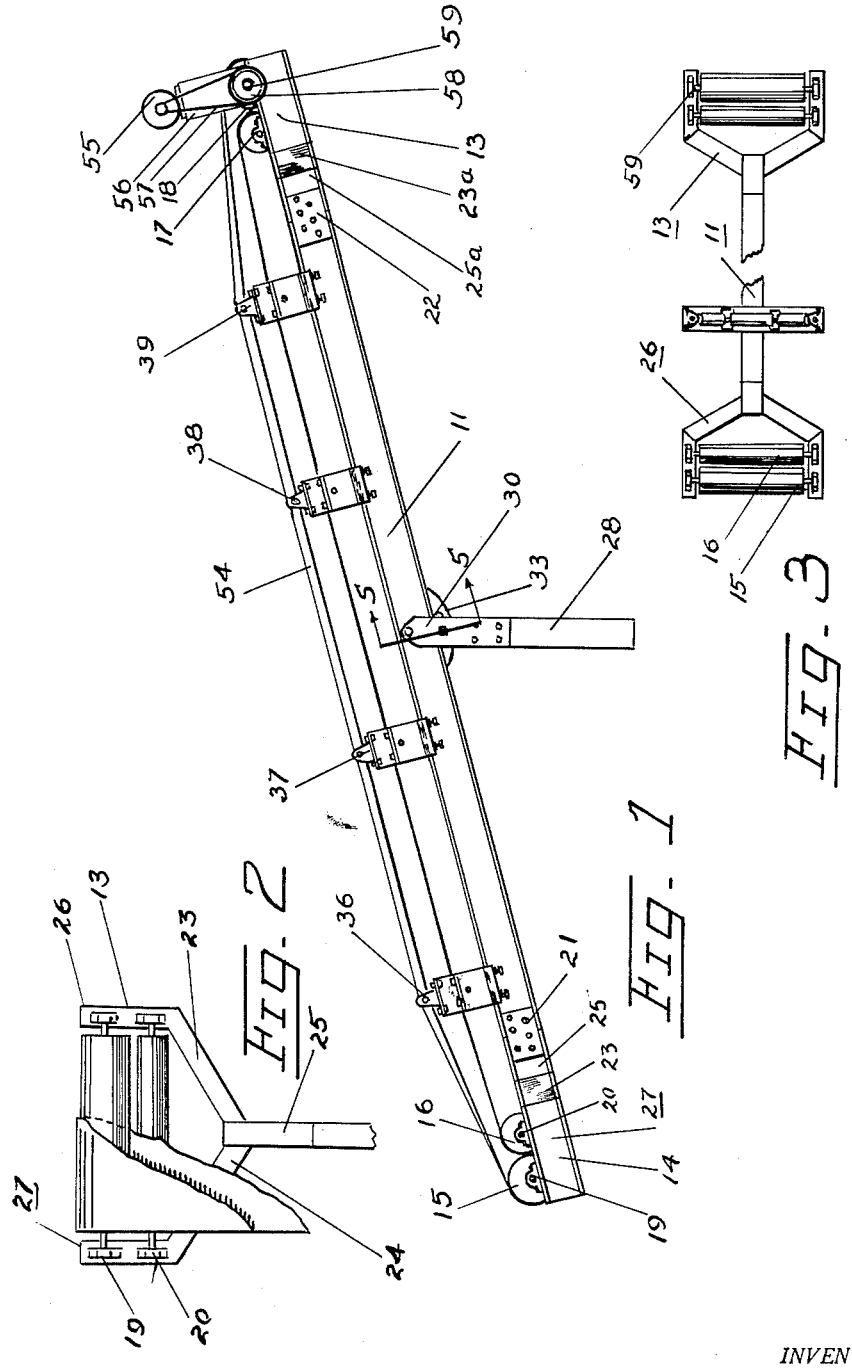
INVENTOR.
LeRoy F. Ramer
BY Corey and Corey
Atty's Sept. 12, 1961 LE ROY F. RAMER 2,999,582
BELT CONVEYORS
Filed April 13, 1959 2 Sheets-Sheet 2
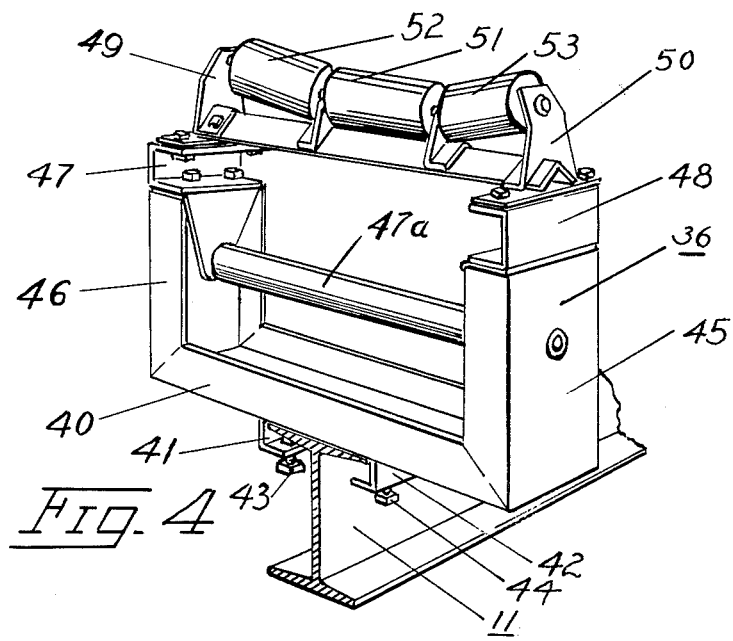
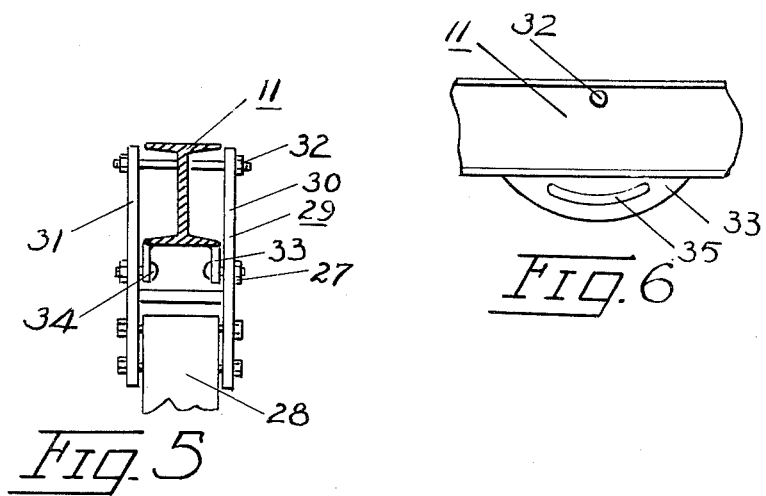
INVENTOR.
LE ROY F. RAMER
BY Corey & Corey
Atty's

United States Patent Office 2,999,582
Patented Sept. 12, 1961

2,999,582
BELT CONVEYORS
Le Roy F. Ramer, 700 Dumont, Richardson, Tex.
Filed Apr. 13, 1959, Ser. No. 805,942
4 Claims. (Cl. 198—192)

This invention is concerned with a belt conveyor and more particularly with one which may be readily assembled in the field and one in which the prime structural member is a single longitudinal metal beam.

It is a primary object of my invention to provide a conveyor structure which uses a single longitudinal metal beam for its primary structural component, said beam being such that a plurality of belt carrying assemblies may be adjustably positioned thereon.

It is another object of my invention to provide a conveyor in which a plurality of belt rollers of substantial length may be positioned in a yoke member at opposite ends of a single metal beam.

It is yet another object of my invention to provide a device in which a conveyor belt may be moved over a series of supports in an area above and free of the central longitudinal load carrying structure of the device.

It is still a further object of my invention to provide a device in which the portion of the belt carrying load can be cupped or formed into a trough at selected positions along the length of the conveyor, dependent on the type of load being carried by the belt.

It is yet another object of my invention to provide a device in which the entire movable portions of the conveyor are in a plane above the lowermost face of the conveyor structure.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a side view of a device constructed according to my invention, showing all the components thereof.

FIGURE 2 is a top view of the end rollers, with the belt threaded between them and a portion of the belt broken away to show the relative positions of the components thereof.

FIGURE 3 is a top view of a conveyor constructed according to my invention, the center section broken away and the belt removed to show the position of the belt carrying rollers.

FIGURE 4 is an enlarged view of a belt troughing section and the rollers which carry the belt.

FIGURE 5 is a view of the longitudinal support rail of a conveyor, taken at line 5—5 of FIGURE 1, to show the mounting of the conveyor on its main support member, the longitudinal rail being shown in cross section, and FIGURE 6 is a side view of the longitudinal rail member at the same station as shown in FIGURE 5, the supporting member having been removed to show the means of clamping the base member at various angles in relation to the longitudinal member.

Referring now to the drawings, and more particularly to FIGURE 1; a conveyor constructed according to my invention includes a central supporting beam, indicated generally at 11. This beam is preferably of steel and formed to reassemble an I. Of course it can be of any suitable size, dependent upon the weight of the material to be carried by the conveyor, but for general construction purposes a standard 6-inch beam is preferred.

Positioned on opposite ends of this I-beam are yoke members 13 and 14. These yoke members are formed of the same material as the longitudinal member and each yoke carries a pair of rollers such as 15 and 16 on yoke 14, and 17 and 18 on yoke 13. These rollers are supported on bearings such as 19 and 20 and attached to the longitudinal member by splice plates 21 or 22.

The nature of the end roller structures is more clearly shown in FIGURE 2. It will be noted that the yoke is formed of two angular members 23 and 24 which in turn are welded to a central member 25 which in turn is attached to the longitudinal beam 11. On the outer ends of the two angular members are two parallel roller support means 26 and 27 on which the previously mentioned bearings 19 and 20 are positioned.

The center portion of the beam is supported by a vertical frame, indicated generally at 28. This frame terminates in a yoke member 29 which is of sufficient width for the longitudinal beam to be positioned between the two legs 30 and 31 of the yoke member. A through bolt 32 is inserted through the plate 30, thence through the longitudinal beam 11, and thence through the plate 31. This bolt supports the longitudinal beam in relation to the yoke and the frame 28 and serves as a pivot point on which the entire conveyor can be turned. To lock the conveyor in relation to this frame member, I have provided a pair of semi-circular plates 33 and 34, each of which has a semi-circular slot, such as 35 of FIGURE 6, through which a bolt 37 can be inserted. This bolt also goes through the plate 30 and, when tightened, will lock the circular plate 33 in relation to the frame member.

To support the belt above the longitudinal member 11, I provide a series of supported roller assemblies such as 36, 37, 38 and 39. The structure of these assemblies is shown in detail in FIGURE 4. The main supporting frame of the assembly comprises a channel 40 which is formed in a rectangle. This frame is positioned on the longitudinal channel 11 on the upper face of the beam. It is held in position in relation thereto by two lip members 41 and 42 which in turn carry locking bolts such as 43 and 44.

This rectangular frame member 40 has two upwardly extending leg portions 45 and 46. A horizontal roller 47a is carried between these two leg members. These rollers are provided to carry the belt as it is moved in either direction towards the end of the conveyor. Positioned on the upper end of these two legs 45 and 46 are two mounting plates 47 and 48, and positioned on these mounting plates are a pair of bearing blocks 49 and 50. These bearing blocks carry a plurality of rollers 51, 52 and 53 which are positioned in a troughing shape and adapted to carry that portion of the belt which is conveying the load. They are semi-circular in order to cause the belt to be cupped or troughed, the outer edges being higher than the center to confine the material carried within the area of the belt.

It will be at once apparent that several such roller assemblies may be positioned on one longitudinal beam and, further, that through the lips 41 and 42 and the locking nuts 43 and 44, the assembly may be moved in either direction along the beam and locked in any selected point. Any number of such stations can be used on a single conveyor, depending on the weight of the load that the conveyor is to carry.

The belt, which actually conveys the material, is indicated generally at 54 and is positioned on the rollers in the following manner. The belt is an endless belt. It is led across the successive rollers 47 to one of the yoke rollers, such as 16 of yoke 14, and then down and around the roller 15, then up and back across the succession of top rollers such as 51, 52, 53 from station 36, and similar rollers until the belt reaches the opposite end of the conveyor where it is threaded around the pulley 18, then up over the pulley 17 and back through the rollers such as 47.

The conveyor is driven by a motor 55 which is positioned at one end of the conveyor on a supporting frame 56 and is operatively connected to one of the rollers such as 18 through a belt 57 and a pulley 58 which is mounted on the shaft 59 of the roller member.

It will be apparent, from the foregoing description, that a conveyor constructed according to my disclosure, may be readily assembled at the operating site. The conveyor can be formed of any number of roller assemblies which may be required, and the longitudinal member may be a series of I-beams fastened one to another by splice plates such as 21 and 22. In practice it is found that I-beams of 20-foot lengths are most satisfactory and that a conveyor can be formed of multiples of such lengths. It is understood of course that the belt will have to be varied and spliced according to the number of I-beam lengths used in a single conveyor.

It will also be apparent that since the end rollers are mounted on bearings above the upper surface of the longitudinal channel and its associated yoke, and since the various supporting roller sections, such as 36 and 37, are also supported above the uppermost surface of this channel, the belt movement will be entirely above the lowermost plane of the channel. In practice, this results in the possibility that the conveyor may be used on a level surface by simply laying it on the ground. This will still not interfere with the travel of the belt or the movement of the supporting rollers. It is therefore apparent that the objects set forth have been achieved by the device, as disclosed herein.

Although I have described a specific embodiment of my invention, it is apparent that modifications thereon may be made by those skilled in the art. Such modifications may be made without departing from the spirit and scope of my invention as set forth in the appended claims.

I claim as my invention:

1. In a portable conveyor, a single longitudinal supporting beam, a yoke member mounted on each end thereof, each of said yoke members carrying a plurality of yoke rollers, one of said rollers being power driven, a plurality of roller assemblies the operative portions thereof being positioned only on the upper face of said longitudinal beam, said roller assemblies being slidable in relation thereto, an endless belt threaded about each of the outermost yoke roller members, thence inwardly through the aforesaid roller assemblies, one portion of said belt riding within said roller assemblies, and one portion of said belt riding above said roller assemblies, the portion above said roller assemblies being cupped to carry material and the like, said belt being operative in a plane above said supporting member.

2. In a device as set forth in claim 1, said roller assemblies being mounted on the upper face of said longitudinal supporting member by means of lip portions having locking nuts thereon.

3. In a device as, set forth in claim 1, said roller assemblies being constructed of rectangular frames having upwardly extending portions above and straight rollers therebetween, and further having secondary troughing rollers positioned thereabove.

4. In a device as set forth in claim 1, said yoke rollers at each end being positioned in the same horizontal plane, said belt being threaded upwardly and inwardly over the innermost of said plurality of rollers.

References Cited in the file of this patent
UNITED STATES PATENTS

| | | |
|---|---|---|
| 1,572,555 | Nelson | Feb. 9, 1926 |
| 2,563,427 | Scott | Aug. 7, 1951 |
| 2,655,253 | Snead | Oct. 13, 1953 |